US012589051B1

(12) United States Patent
Yan

(10) Patent No.: US 12,589,051 B1
(45) Date of Patent: Mar. 31, 2026

(54) MASSAGER

(71) Applicant: BELIEF TECHNOLOGY (DONGGUAN) CO., LTD., Dongguan (CN)

(72) Inventor: Li Yan, Dongguan (CN)

(73) Assignee: BELIEF TECHNOLOGY (DONGGUAN) CO., LTD., Dongguan (CN)

( * ) Notice: Subject to any disclaimer, the term of this patent is extended or adjusted under 35 U.S.C. 154(b) by 0 days.

(21) Appl. No.: 19/176,212

(22) Filed: Apr. 11, 2025

(30) Foreign Application Priority Data

Sep. 30, 2024 (CN) ......................... 202411389912.2
Jan. 7, 2025 (CN) ......................... 202510025865.1

(51) Int. Cl.
*A61H 19/00* (2006.01)

(52) U.S. Cl.
CPC ..... *A61H 19/40* (2013.01); *A61H 2201/1215* (2013.01); *A61H 2201/149* (2013.01)

(58) Field of Classification Search
USPC ......................................... 600/38, 39, 40, 41
See application file for complete search history.

(56) References Cited

U.S. PATENT DOCUMENTS 5,063,911 A * 11/1991 Teranishi ........... A61H 23/0254 D24/200
12,144,775 B1 * 11/2024 Yan ...................... A61H 9/0057
2014/0309565 A1 * 10/2014 Allen ..................... A61H 19/44 601/46
2015/0148592 A1 * 5/2015 Kanbar .................. A61H 19/34 600/38
2024/0299239 A1 * 9/2024 Yan .................... A61H 23/0254
2024/0299240 A1 * 9/2024 Yan ........................ A61H 19/30

OTHER PUBLICATIONS

Amazon.com: G Spot Vibrator Sex Toys-3 in 1: Health & Household. (2025). https://www.amazon.com/Vibrators-Vibrating-Massaging-Waterproof-Stimulator/dp/B0D9QW6WT1 (Year: 2025).*
Amazon.com: Rose Sex Toy Women Vibrator: Health & Household. (2025b). https://www.amazon.com/Vibrator-Stimulator-Vibrators-Clitoral-Massager/dp/B0BWLW616D (Year: 2025).*

* cited by examiner

*Primary Examiner* — Charles A Marmor, II
*Assistant Examiner* — Marc D. Honrath
(74) *Attorney, Agent, or Firm* — Ming Jiang; OPENPTO US LLC

(57) ABSTRACT

Disclosed is a massager, including a massager body and two massage elements arranged on a circumferential wall surface on opposite sides of an axis of the massager body; the two massage elements perform synchronized but opposite-direction oscillation; and the oscillation is linear oscillation or orbital oscillation. Relative oscillation of the massage elements can cover both sides of a massage area, effectively solving the problem of uneven local pressure caused by unilateral stimulation. The synchronized but opposite-direction oscillation reduces discomfort caused by asynchronous stimulation, providing a user with more natural and comfortable massage experience.

16 Claims, 8 Drawing Sheets

MASSAGER

CROSS-REFERENCE TO RELATED APPLICATIONS

The present application claims priority of Chinese Patent Application No. 20 2510025865.1 (filed on Jan. 7, 2025, under examination), which claims the priority of Chinese Patent Application No. 202411389912.2 (filed on Sep. 30, 2024, withdrawn). The content of the aforementioned patent application under examination is hereby incorporated by reference in its entirety.

TECHNICAL FIELD

The present disclosure belongs to the technical field of massagers, relates to the technology for improving massage sensation, and particularly relates to a massager.

BACKGROUND

A massager is a device designed to massage, relax, or relieve pressure on specific parts of a human body through a mechanical structure and a power device. In recent years, as users have increasingly pursued a healthy lifestyle, massagers have gradually evolved into multi-purpose devices with diverse functions and innovative structures.

Existing massagers have developed into various types, such as a telescopic massager, a sucking massager, and a rolling massager. Specifically, the telescopic massager drives a massage head to extend and retract in an axial direction through a power device; the sucking massager simulates sucking action through negative pressure changes by using pneumatic or vacuum technology; and the rolling massager achieves massage by arranging rolling massage beads in a circular path and driving a drive mechanism.

However, although the above massagers offer a certain degree of practicality and comfort for massage, they provide relatively limited stimulation sensation for massage in a human body.

SUMMARY

In order to solve the above technical problems, the present disclosure provides a massager.

In order to achieve the above objectives, the present disclosure adopts the following technical solutions:

the present disclosure provides a massager, including:

a massager body and two massage elements arranged on a circumferential wall surface on opposite sides of an axis of the massager body;

where the two massage elements perform synchronized but opposite-direction oscillation; and the oscillation is linear oscillation or orbital oscillation.

Preferably, the massager further includes a transmission assembly configured to drive the massage elements to perform the linear oscillation; and the two massage elements are driven by the same transmission assembly to perform the synchronized but opposite-direction linear oscillation.

Preferably, the transmission assembly includes:

a drive member having rotational driving force;

a rotary stage sleeved on the drive member;

where a sliding groove is formed on a circumferential surface of the rotary stage, a cross-sectional shape of the sliding groove is an ellipse, the cross-sectional shape is formed by cutting in a direction parallel to the sliding groove, and a non-right angle is formed between a major axis of the ellipse and an axis of the rotary stage;

an oscillating frame, the oscillating frame is arranged in cooperation with the sliding groove, and performs oscillating motion caused by periodic undulation of the sliding groove when the rotary stage rotates, and transmits the oscillating motion to the massage elements; and a constraint member connected to the oscillating frame, and configured to constrain rotation of the oscillating frame in a circumferential direction.

Preferably, the massage element includes a central structural portion and a lateral structural portion; and both the central structural portion and the lateral structural portion extend in a direction away from a circumferential wall surface of the massager body.

Preferably, the lateral structural portion is an arc-shaped curved structure, starts from one side of the central structural portion, curves outward in a direction away from the central structural portion, and gradually extends to form an arc-shaped contour.

Preferably, a number of the lateral structural portions is two, which are respectively arranged on opposite sides of the central structural portion in the axis direction of the massager body.

Preferably, the central structural portion is sheet-like, cylindrical, or spherical.

Preferably, the central structural portion and the lateral structural portion are connected by an elastic wall.

Preferably, the central structural portion is a hollow structure, and the lateral structural portion is a solid structure.

Preferably, the oscillating frame includes two oscillating arms that are arranged opposite to each other; and the two oscillating arms are respectively embedded in the central structural portion of the two massage elements.

Preferably, the circumferential wall surface of the massager body is provided with a slot recessed toward the axis of the massager body;

the massage element is positioned in the slot; and the central structural portion and the lateral structural portions are partially located in the slot, and partially protrude above an opening plane of the slot.

Preferably, the massager further includes a first drive assembly configured to drive the massage elements to perform the orbital oscillation; and the two massage elements are driven by the same first drive assembly to perform the synchronized but opposite-direction orbital oscillation.

Preferably, the first drive assembly includes:

a motor having rotational driving force;

a connecting structure in transmission connection with the motor;

a rotating disk connected to the connecting structure; and the two massage elements are inserted into insertion ports on the rotating disk at opposite inclination angles.

Preferably, the connecting structure includes:

a first gear meshed and connected with a toothed surface of a sidewall surface of the rotating disk;

a second gear meshed and connected with the first gear; and the second gear being connected to a drive end of the motor.

Preferably, the massager further includes a first massage device;

the first massage device is arranged in the massager body; and the first massage device is configured to provide massage stimulation in the form of vibration.

Preferably, the massager body is provided with a support arm; and the support arm is arranged on the circumferential wall surface of the massager body.

Preferably, an end of the support arm is provided with a plurality of elastic auxiliary massage arms.

Preferably, the massager further includes a second massage device;

the second massage device is arranged in the support arm; and the second massage device is configured to provide massage stimulation in the form of vibration.

Preferably, the massager body is configured as a rod-shaped or a spherical body.

Preferably, the massager body includes a hard inner shell and an elastic outer layer, and the outer layer is wrapped around the inner shell.

The present disclosure provides a massager, which has the following beneficial effects:

the oscillating motion in the axis direction of the massager body enables the massage elements to generate dynamic push-pull or tapping stimulation sensation during operation, which is particularly effective for deep relaxation of muscle. Relative oscillation of the massage elements can cover both sides of the massage area, effectively solving the problem of uneven local pressure caused by unilateral stimulation. The synchronized but opposite-direction oscillation reduces discomfort caused by asynchronous stimulation, providing the user with more natural and comfortable massage experience.

REFERENCE NUMERALS IN THE ACCOMPANYING DRAWINGS

1. massager body; 101. first end; 102. second end; 103. inner shell; 104. outer layer; 2. wiring harness tube; 3. operating handle; 4. massage element; 401. central structural portion; first root portion; 4011. second root portion; 4012. second tail portion; 402. lateral structural portion; 4021. first root portion; 4022. first tail portion; 5. elastic wall; 6. slot; 601. bottom edge; 602. first side edge; 603. second side edge; 604. first opening; 605. second opening; 7. transmission assembly; 701. drive member; 702. gearbox; 703. drive rod; 704. rotary stage; 705. sliding groove; 706. oscillating frame; 707. oscillating arm; 708. notch; 801. latching groove; 802. latching projection; 901. first massage device; 902. support arm; 9021. auxiliary massage arm; 903. second massage device; 10. constraint member; 11. first drive assembly; 1101. motor; 1102. rotating disk; 1103. first gear; 1104. second gear; 12. second drive assembly; 1201. driving gear; 1202. rotary motor; and 1203. driven gear.

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

Figure 1:
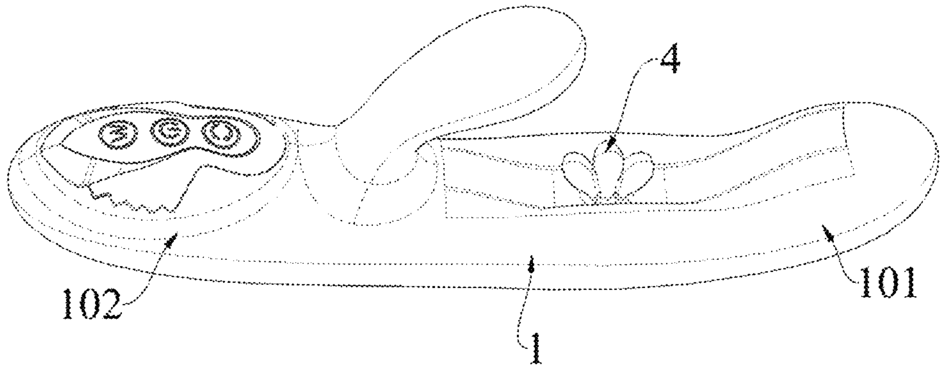
FIG. 1 is a first perspective view of a massager according to the present disclosure.

As shown in FIGS. 1-17, specific embodiments provided by the present disclosure are as follows:

In one embodiment, as shown in FIG. 1, a massager body 1 is designed to be insertable into a human body and to drive a massage element 4 into the human body to provide internal massage stimulation.

According to some embodiments, the massager body 1 is a rod-shaped structure that is designed to be partially insertable into the human body, and includes a first end 101 and a second end 102. When being inserted into the human body, the first end 101 serves as an insertion end, and the insertion end contacts and enters the human body when the massager is inserted into the human body. The second end 102 serves as a handheld end for a use to grip and operate the massager, the second end 102 has an operating function, and a user can control and operate the massager through the second end 102, including but not limited to:

starting and stopping the massage element 4: the user can activate or deactivate the massage element 4 by pressing a button, toggling a switch, or touching an interface;

adjusting a massage frequency: the user can select different massage frequencies through a control unit of the second end 102 to meet various massage needs; and

- adjusting a massage intensity: the user can set intensity parameters of the massage element 4 through the control unit to control an intensity of massage, such as gentle massage, moderate massage, or high-intensity massage.

The control unit may include: a physical button or switch for direct and simple pressing operation; a knob or a slider for precise adjustment of frequency and intensity; an electronic display interface for displaying current operating status and massage settings in real time.

Figure 2:
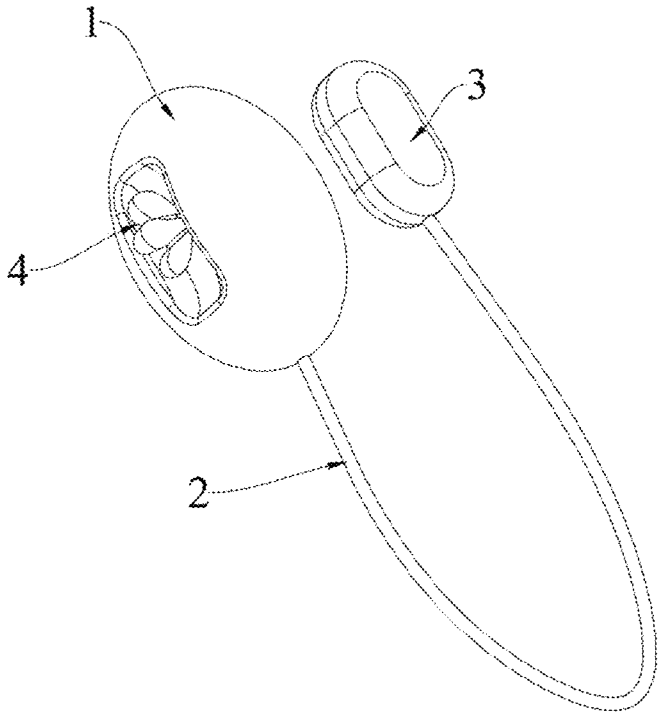
FIG. 2 is a second perspective view of a massager according to the present disclosure.

According to some embodiments, as shown in FIG. 2, the massager includes a massager body 1, and the massager body 1 is designed to be fully insertable into a human body. Specifically, the massager body 1 is a spherical body or a quasi-spherical body, and its structural design enables the entire spherical body or quasi-spherical body to be completely placed in the human body, thereby achieving deeper and more precise massage stimulation effect. Through the design, the massager can effectively cover a specific massage area and provide more targeted massage experience.

The massager body 1 is connected to an operating handle 3 through a wiring harness tube 2. The wiring harness tube 2 has multiple functions: the wiring harness tube 2 provides a convenient retrieval mechanism for the massager body 1, ensuring that the massager can be safely and easily withdrawn from the human body after use, thereby improving the safety of the massager; The wiring harness tube 2 is used for housing and protecting internal wiring such as power cables and signal lines, and a structural design of the wiring harness tube can ensure the orderliness of the lines and effectively avoiding damage to the lines from an external environment. The wiring harness tube 2 is made from highly flexible materials, so the wiring harness tube can bend or stretch naturally in different usage postures to adapt to different operating needs of the user, which further improves the ease of operation and the scope of application of the massager.

A control unit is integrated into the operating handle 3, such that the user can fully control the massager through the operating handle 3, including activating or deactivating the massage element 4, adjusting frequency and intensity, and the like. The control unit is designed with an ergonomic layout to ensure that the user can operate the massager easily and intuitively. The compactness and integrated design of an overall structure not only improves operating experience of the massager, but also enhances portability and safety of the massager.

Figure 3:
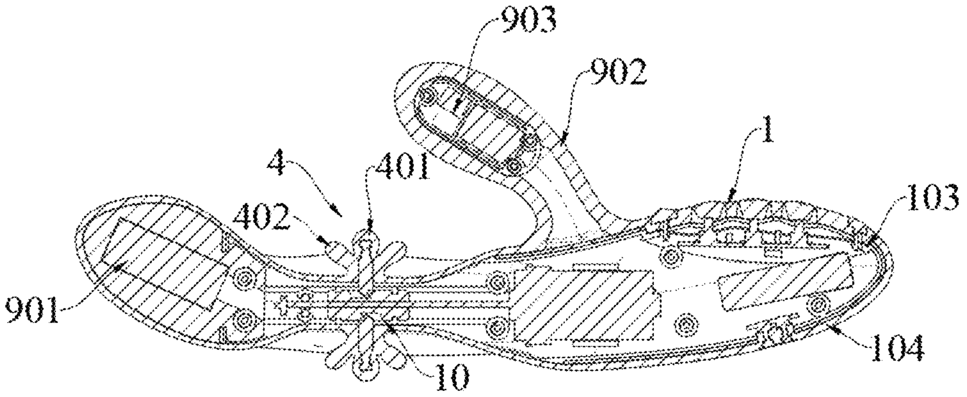
FIG. 3 is a first sectional view of a massager according to the present disclosure.

As shown in FIG. 3, the massager body 1 includes an inner shell 103 and an outer layer 104 to achieve an optimal combination of structural stability and user comfort. The inner shell 103 is composed of two hard shells with symmetrically structures, and the hard shells are joined together through a precision snap-fit design to form a complete body structure. A main structural shape of the inner shell 103 can be configured as a rod-shaped, a spherical body, or a quasi-spherical body according to actual needs.

The hard material and symmetrical structure of the inner shell 103 ensure that the massager body 1 has sufficient rigidity and strength during use, and is not prone to deformation or damage. The symmetrical snap-fit design simplifies an assembly process, improves production efficiency and ease of maintenance of the massager. The availability of a variety of main body shape makes the massager adapt to different use scenarios and massage needs, improving both applicability and applicability of the massager.

The outer layer 104 is made from high-performance elastic material, and is uniformly wrapped around an outer surface of the inner shell 103. The outer layer 104 of elastic material provides a soft surface, such that the massager body 1 can better conform to skin or tissue, greatly improving the user comfort during use. The outer layer 104 also plays a cushioning role, effectively reducing a direct pressure when the hard shell is in contact with the human body, avoiding discomfort during use and protecting the skin tissue. The elastic material usually features water-resistant and stain-resistant properties, making the massager easier to clean and maintain, and accordingly extending a service life of the massager.

In addition, depending on specific needs, the outer layer 104 may be made from different elastic materials such as silicone or medical-grade polymers, to meet different application environments and safety requirements. Further, the outer layer 104 may also be designed with anti-slip texture or surface treatment of a specific shape to further improve performance of the outer layer under complex operating conditions.

As shown in FIG. 3, two massage elements 4 are mounted on a circumferential wall of the massager body 1, and adopts a relative arrangement structure. The term “relative arrangement” refers to a layout where an axis of the massager body 1 is taken as a symmetrical dividing line, and the two massage elements 4 are symmetrically arranged on opposite sides of the axis of the massager body 1.

The massage element 4 can perform synchronized but opposite-direction oscillation, and the oscillation may take the following two forms:

- first, the massage element 4 performs reciprocating linear oscillation similar to a pendulum. the massage element 4 can perform the reciprocating linear oscillation in a certain plane, so ends of the massage element 4 will trace a smooth and open arc trajectory (similar to trajectory of a pendulum).

Second, the massage element 4 can perform orbital oscillation similar to drawing a circle. The ends of the massage element 4 trace a closed curve during a complete oscillation cycle, such as near-circular, elliptical, or other annular shapes. The motion with the closed trajectory can cover a small area rather than a single line.

It should be noted that the term “oscillation” in the following content encompasses one of the above two motion patterns, which will not be repeated below.

Moreover, the synchronized but opposite-direction oscillation makes the two massage elements 4 provide dynamic compressive stimulation of a massage area, thereby producing uniform and rhythmic massage effect.

The motion of the two massage elements 4 is strictly synchronized in an axis direction of the massager body 1, avoiding disordered massage rhythm often seen in traditional designs due to asynchronous motion. With the symmetrical layout, the two massage elements 4 can uniformly distribute massage force during operation, avoiding imbalance caused by unilateral force application.

Overall, the oscillating motion in the axis direction of the massager body 1 enables the massage elements 4 to generate dynamic push-pull or tapping stimulation sensation during operation, which is particularly effective for deep relaxation of muscle. The oscillation of the massage elements 4 can cover both sides of the massage area, effectively solving the problem of uneven local pressure caused by unilateral stimulation. The synchronized but opposite-direction oscillation reduces discomfort caused by asynchronous stimulation, providing the user with more natural and comfortable massage experience.

As shown in FIG. 3, and more further, each massage element 4 includes a central structural portion 401 and a lateral structural portion 402, the central structural portion and the lateral structural portion can in coordination to stimulate a massage area on an external or internal surface of the human body, forming multi-layered massage sensation in a certain area of the massage area under the effect of oscillation. Both the central structural portion 401 and the lateral structural portion 402 are structures that extend regularly in a specific direction, and extend in a direction away from the massager body 1; where an outer edge of the central structural portion 401 and an outer edge of the lateral structural portion 402 are located on a same arc segment. The term "outer edge" refers to a structural boundary of the central structural portion 401 or the lateral structural portion 402 away from the massager body 1.

Figure 4:
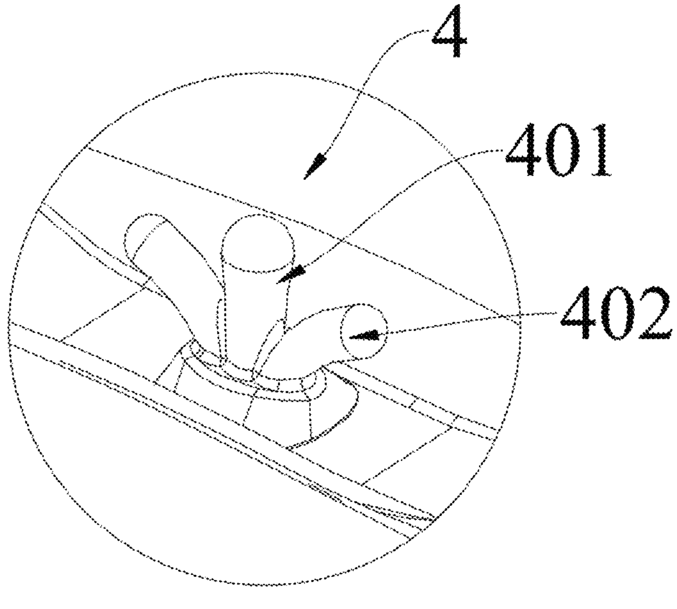
FIG. 4 is a first structural diagram of a massage element of a massager according to the present disclosure.
Figure 5:
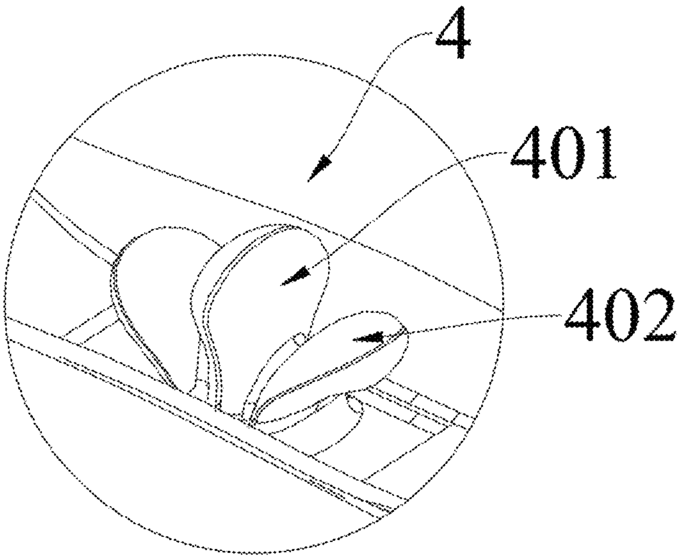
FIG. 5 is a second structural diagram of a massage element of a massager according to the present disclosure.
Figure 6:
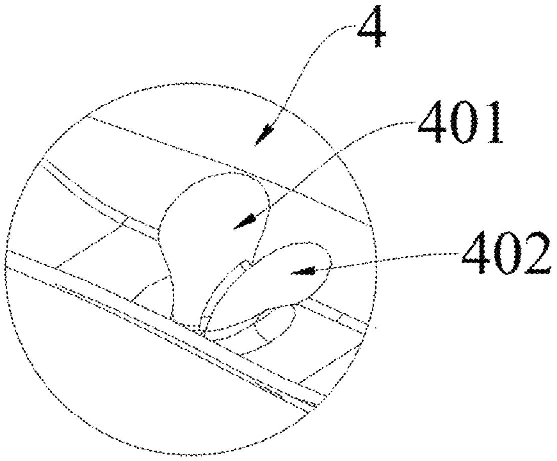
FIG. 6 is a third structural diagram of a massage element of a massager according to the present disclosure.

According to some embodiments, as shown in FIGS. 4-5, a number of the lateral structural portions 402 is two, and the two lateral structural portions are respectively arranged on opposite sides of the central structural portion 401 in the axis direction of the massager body 1. As shown in FIG. 6, alternatively, a number of the lateral structural portions 402 is one, which is positioned on one side of the central structural portion 401 in the axis direction of the massager body 1.

That is to say, by providing a combination of the central structural portion 401 and the lateral structural portions 402 in the massage element 4, the design of this embodiment overcomes the problem in the prior art that oscillation of a single massage head deviates from a perpendicular position relative to the massage area, resulting in weakened massage force. In this embodiment, when the central structural portion 401 deviates from a perpendicular position relative to the massage area during an oscillation process, the lateral structural portion 402, through synchronized motion with the central structural portion 401, can compensate for the insufficient massage force caused by the deviation of the central structural portion 401. Specifically, regardless of being positioned on the opposite sides or only one side of the central structural portion 401, the lateral structural portions 402 are capable of moving to a position perpendicular to the massage area during oscillation, thereby applying continuous and intensified massage force on the massage area. Moreover, this structure achieves more even distribution of massage force, ensuring that the massage effect is not affected by changes in an oscillation angle, such that overall performance and user experience of the massager are significantly improved, and more obvious advantages are demonstrated in areas with complex curved surfaces.

Further, the coordinated integration of the central structural portion 401 and the lateral structural portion 402 in the massage element 4 not only addresses the problem of weakened massage intensity due to changes in the oscillation angle, but also substantially expands the effective massage coverage area. During synchronized oscillation, the lateral structural portion 402 can compensate for areas that are not fully contacted by the central structural portion 401, further improving the comprehensiveness and adaptability of the massage. Especially for a massage area with a complex contour or a large surface area, this structure can cover the massage area more uniformly and reduce the occurrence of massage blind sites. In addition, this structure also improves the stability of the massager during oscillation in different directions, making the massage process smoother and more natural, and providing the user with a strong, uniformly distributed, and comfortable multi-layered massage experience.

Figure 8:
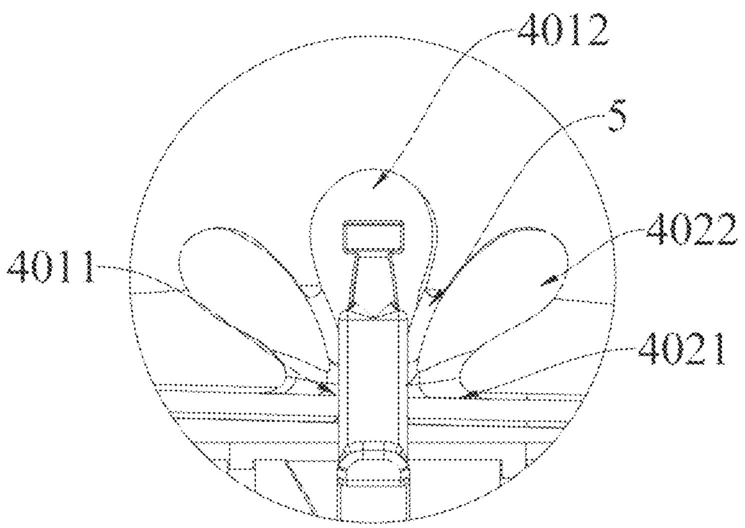
FIG. 8 is a sectional view of a massage element of a massager according to the present disclosure.

As shown in FIG. 8, in one specific embodiment, the lateral structural portion 402 is an arc-shaped curved structure, starting from one side of the central structural portion 401 and curving outward in a direction way from the central structural portion 401 and gradually extending to form an arc-shaped contour. Specifically, the lateral structural portion 402 includes a first root portion 4021 and a first tail portion 4022, the first root portion 4021 is connected to the circumferential wall of the massager body 1, and is configured to provide structural stability and to ensure that the lateral structural portion 402 remains stable during motion without displacement or detachment. The first tail portion 4022 is located at one end away from the massager body 1, and is configured to be in contact with the massage area to perform the massage function.

It is foreseeable that the lateral structural portion 402 adopts an arc-shaped curved structure, such that the lateral structural portion can better conform to the massage area at all times, especially in complex curved regions. In addition, the arc-shaped curved structure has the characteristics of reversibly elastic stretching during the oscillating motion, and the elastic stretching cannot only effectively distribute points of action of the massage force over a broader area, but also contributes to smoother transition of massage intensity, such that discomfort caused by single-point pressure is avoided, and the user experiences more comfortable massage. Further, the reversibly elastic stretching can also absorb and release a certain amount of kinetic energy, the efficiency of the oscillating motion is improved, such that the lateral structural portion 402 always maintains a stable and uniform massage force throughout the oscillation process, which is conducive to achieving deeper massage effect and significantly improving the mechanical adaptability and service life of the massager. Under the effect of the reversibly elastic stretching, the lateral structural portion 402 can exert additional elastic rebound force on the massage area while applying pressure, which is conducive to producing deeper massage stimulation to underlying tissues, thereby enhancing the effect of promoting muscle relaxation and blood circulation.

Specifically, the first root portion 4021 and first tail portion 4022 can be understood as local structural components with a certain length or volume on the lateral structural portion 402, the structural components are configured to the morphological partitioning and functional attributes of the lateral structural portion 402. However, there is no distinct boundary line between the two structural components; and they are joined together through a continuous transition.

An area between the first root portion 4021 and the first tail portion 4022 has an arc-shaped curved profile, which gradually extends in a direction away from the central structure portion 401 to form a dynamic and smooth curve shape. Under the action of oscillation, the first tail portion 4022 of the lateral structural portion 402 produces continuous contact effect with the massage area.

In some embodiments, the lateral structural portion 402 may be in a sheet-like form, and a specific shape of the lateral structural portion is the same as or similar to a shape of human tongue, so as to adapt to a specific massage area, and provide more comfortable massage effect.

In addition, the lateral structural portion 402 may also be a columnar shape, a spherical shape, or other curved surface shapes to meet different usage needs, and the shapes can adapt to morphological characteristics of massage areas, and provide multi-point contact and multi-layered massage stimulation.

According to some embodiments, as shown in FIGS. 3-6, the lateral structural portion 402 exhibits an arc-shaped bending structure and a memory property (a property of returning to its initial state after deformation). Specifically, when being subjected to resistance from the massage area, the lateral structural portion 402 can elastically bend in a direction opposite to a the current arc bending direction, and will restore to an initial arc bending state according to the memory property after the resistance disappears or weakens.

According to some embodiments, as shown in FIG. 8, the lateral structural portion 402 has varying thickness distributions. Specifically, in the direction away from the massager body 1, the lateral structural portion 402 includes a first structural section and a second structural section, sequentially starting from the first root portion 4021 and ending at the first tail portion 4022, and the first structural section and the second structural section have different dimensional ranges.

The first structural section has a first dimensional range, a thickness of the first structural section is the same or nearly the same overall, thereby ensuring the structural stability and uniform distribution; and the second structural section has a second dimensional range, and a thickness of the second structural section gradually increases in the direction away from the first root portion 4021, and then gradually reduces after reaching a maximum value. A maximum thickness of the second structural section is significantly greater than a maximum thickness or an average thickness of the first structural section, thereby providing additional strength and contact effect.

Therefore, the uniform thickness of the first structural section ensures a firm connection between the lateral structural portion 402 and the massager body 1; the thickness variation of the second structural section adapts to different massage pressure requirements, and the section with the maximum thickness provides stronger force, and the section with gradually reducing thickness achieves smooth transition effect.

The first dimensional range is 0.5 mm-1.5 mm, and preferably 1 mm. The second dimensional range is 2 mm-4 mm, and preferably 4 mm.

Figure 7:
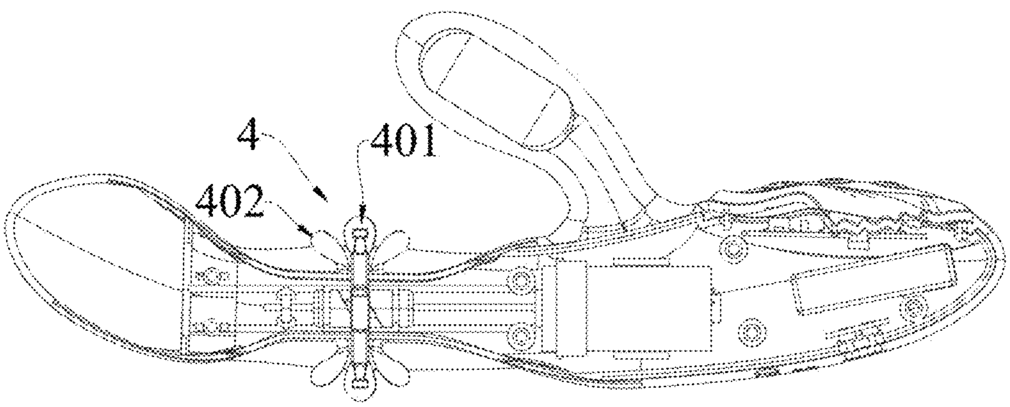
FIG. 7 is a second sectional view of a massager according to the present disclosure.

According to some embodiments, as shown in FIGS. 7 and 8, the central structure portion 401 is a linearly extending structure and extends along axis of the massage element 4. Specifically, the central structure portion 401 in a straight line shape, and a second root portion 4011 of the central structure portion is tightly connected to the circumferential wall of the massager body 1, and the central structure portion 401 extends along the axis of the massage element 4 to a defined length, and ends at a second tail portion 4012 of the central structure portion.

A relationship between the axis of the massage element 4 and the axis of the massager body 1 varies with the shape of the massager body 1. When the massager body 1 is a straight rod-like body, the axis of the massage element 4 is approximately perpendicular or exactly perpendicular to the axis of the massager body 1. When the massager body 1 is a rod-shaped structure with a certain curvature, the two axes may form an angle, but generally remain close to perpendicular. When the massager body 1 is a spherical body or a quasi-spherical body, the axis of the massage element 4 points to a center of the spherical body or quasi-spherical body, and is configured according to geometric properties of the center to ensure effective operation of the massage element 4.

According to some embodiments, the central structural portion 401 has varying thickness distributions. Specifically, in the direction away from the massager body 1, the central structural portion 401 includes a third structural section and a fourth structural section, sequentially starting from the second root portion 4011 and ending at the second tail portion 4012, and the third structural section and the fourth structural section have different dimensional ranges:

The third structural section has a third dimensional range, a thickness of the third structural section is the same or nearly the same overall, thereby ensuring the structural stability and uniform distribution; and the fourth structural section has a fourth dimensional range, and a thickness of the fourth structural section gradually increases in the direction away from the second root portion 4011, and then gradually reduces after reaching a maximum value. A maximum thickness of the fourth structural section is significantly greater than a maximum thickness or a thickness of the third structural section, and also significantly greater than the thickness of the third structural section, thereby providing additional strength and contact effect.

The third dimensional range is 0.5 mm-1.5 mm, and preferably 1 mm. The fourth dimensional range is 2 mm-6 mm, and preferably 5 mm.

It should be noted that there is no distinct boundary line between the second root portion 4011 and the second tail portion 4012. It can be understood that the second root portion 4011 is a local part of the central structural portion 401 near the massager body 1, and the second tail portion 4012 is local part of the central structural portion 401 away from the massager body 1.

The first structural section and the second structural section may be distinguished based on the thickness, and the second structural section is configured to be in contact with massage area. The central structural portion 401 exhibits memory property, that is, it possesses a restoring force to maintain an original position. When the massage element 4 is subjected to resistance from the massage area, the central structural portion 401 will undergo elastic deformation and rapidly rebound to its original position once the external force is removed. The memory property not only enhances the adaptability of the massage element 4 but also allows fine adjustment according to the shape and needs of the massage area, thereby optimizing the massage effect.

In addition, the central structural portion 401 may be sheet-like, cylindrical, or spherical.

As shown in FIG. 8, in some embodiments, the central structural portion 401 and the lateral structural portion 402 are connected by an elastic wall 5. A height of the connection area is not greater than the third structural section of the central structural portion 401 and the first structural section of the lateral structural portion 402. The elastic wall 5 has a certain degree of elasticity, and usually exerts elastic force to pull the lateral structural portion 402 toward the central structural portion 401.

In some specific embodiments, the first root portion 4021 of the lateral structural portion 402 and the second root portion 4011 of the central structural portion 401 are respectively and independently connected to the circumferential wall of the massager body 1. Further, a length of gap between the first root portion 4021 and the second root portion 4011 is not greater than 1.5 mm.

In other specific embodiments, the first root portion 4021 of the lateral structural portion 402 and the second root portion 4011 of the central structural portion 401 are connected to a same connector, and the connector is integrally connected to the circumferential wall of the massager body 1. The connector may be a hemispherical structure protruding a certain height away from the circumferential wall of the massager body 1.

Figure 9:
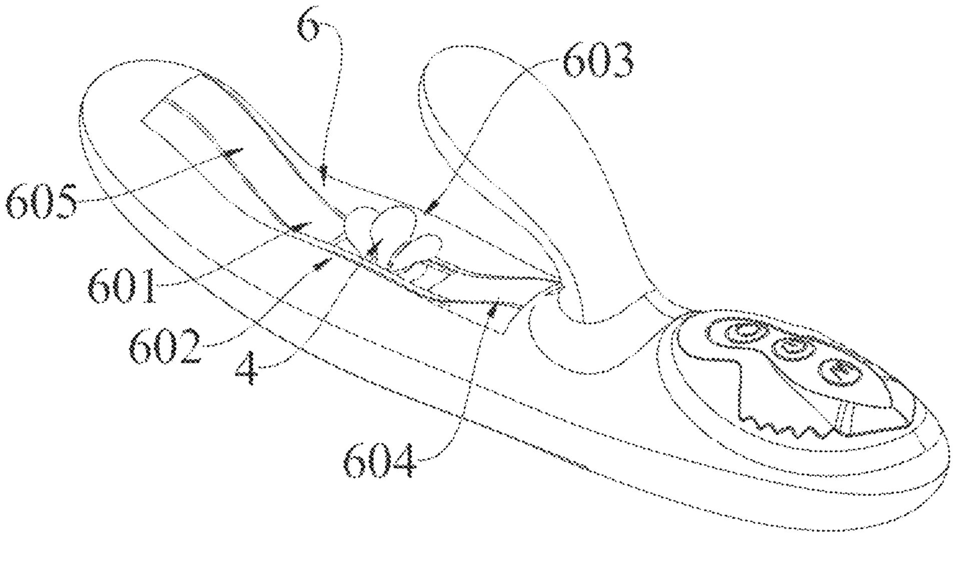
FIG. 9 is a third perspective view of a massager according to the present disclosure.

As shown in FIG. 9, in some specific embodiments, a slot 6 is formed on the massager body 1, and the massage element 4 is positioned at a bottom edge 601 of the slot 6. A length direction of the slot 6 is consistent with the axis direction of the massager body 1, and an internal space of the slot 6 provides a stable motion trajectory for the massage element 4. The slot 6 has a first side edge 602 and a second side edge 603, both of the side edges are ridge-shaped protrusions and are parallel to the axis of the massager body 1. The first side edge 602 and the second side edge 603 can effectively provide a space limit for the massage element 4, preventing the massage element 4 from directly contacting internal body tissue or skin, thereby avoiding unnecessary damage to the skin.

Specifically, when the massage element 4 enters the human body, the first side edge 602 and the second side edge 603 play a blocking role to prevent the massage element 4 from excessively deflecting or colliding with surrounding tissues, such that the massage element 4 can oscillate within a relatively fixed range. Since the slot 6 limits the motion of the massage element 4, the massage element 4 can perform regular motion in the confined space, thereby improving the massage effect and ensuring comfort and precision of the massage process. In addition, the oscillation of the massage element 4 is constrained by the ridge-shaped protrusions on both sides of the slot 6, preventing the massage element from excessively deflecting or non-uniform motion after the massage element 4 enters the human body, thereby making the massage effect more balanced and gentle.

A first opening 604 and a second opening 605 are formed on the slot 6 in the axial direction of the massager body 1. The bottom edge 601 of slot 6 at the first opening 604 and the second opening 605 forms a smooth arc-shaped transition in the direction away from the axis of the massager body 1, and is smoothly connected to the circumferential wall of the massager body 1.

Regarding the dimensions of the slot 6, a width of the slot ranges from 20 mm to 35 mm, a length of the slot ranges from 50 mm to 70 mm, and a depth of the slot ranges from 3 mm to 6 mm.

In some specific embodiments, the slot 6 may be a rectangle, a circle, an ellipse.

Figure 10:
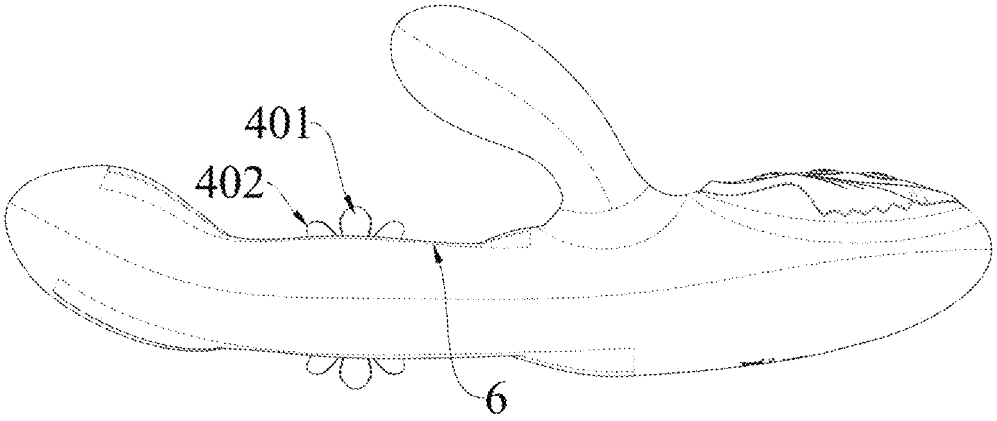
FIG. 10 is a front view of a massager according to the present disclosure.

As shown in FIG. 10, in some specific embodiments, both the central structural portion 401 and the lateral structural portion 402 protrude above an opening plane of the slot 6. It should be understood that parts of the second tail portion 4012 of the central structural portion 401 and the first tail portion 4022 of the lateral structural portion 402 are both higher than the slot 6, so as to ensure that the central structural portion 401 and the lateral structural portion 402 can be in full contact with the massage area of the human body, and produce massage stimulation during the oscillation motion.

As stated above, the depth of slot 6 ranges from 3 mm to 6 mm, and heights of the central structural portion 401 and the lateral structural portion 402 are 2 mm-4 mm higher than the depth of the slot 6. For example, when the depth of the slot 6 is 3 mm, then the height of the central structural portion 401 can be 5 mm, and the height of the lateral structural portion 402 can be 6 mm.

Figure 11:
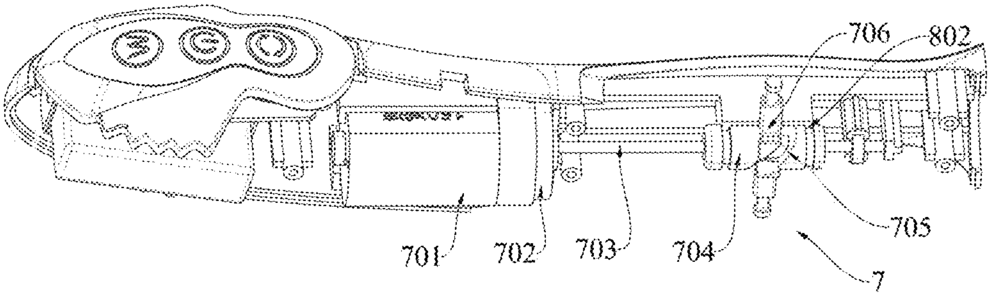
FIG. 11 is a structural diagram of a transmission assembly of a massager according to the present disclosure.

As shown in FIG. 11, in a specific embodiment, a transmission assembly 7 drives the massage element 4 to perform linear oscillation. Specifically, a drive member 701 of the transmission assembly 7, such as a motor, is located inside the inner shell 103 of the massager body 1. An end of the drive member 701 is usually connected to a gearbox 702, and the gearbox 702 is connected to one end of a drive rod 703. The other end of the drive rod 703 is rotatably connected to an interior of the inner shell 103. A rotary stage 704 capable of rotating in unison synchronously with the drive rod 703 is sleeved on a shaft of the drive rod 703. A sliding groove 705 is formed on a circumferential surface of the rotary stage 704. The sliding groove 705 adopts an overall closed-loop structure, and is distributed with periodic undulations in an axial direction of the rotary stage 704. It should be understood that a formation path of the sliding groove 705 has an undulating property. Therefore, when an oscillating frame 706 is in sliding cooperation with the sliding groove 705, rotation of the rotary stage 704 causes relative rotation between the sliding groove 705 and the oscillating frame 706. An inner wall of the sliding groove 705 with undulating property continuously pushes the oscillating frame 706 to produce cyclic oscillating motion.

An oscillating arm 707 is arranged on a circumferential wall of the oscillating frame 706, the oscillating arm 707 is embedded in an interior of the central structural portion 401, and drives the central structural portion 401 to oscillate synchronously, and also drives the lateral structural portion 402 to oscillate in unison.

A cavity is formed inside the central structural portion 401, and the oscillating arm 707 is embedded inside the cavity. It should be understood that the central structural portion 401 is a hollow structure, and the lateral structural portion 402 is a solid structure.

Through a combined structure of the drive member 701, the motor, the gearbox 702, and the drive rod 703 of the transmission assembly 7, efficient power transmission is achieved. The drive member 701 is located in the inner shell 103 of the massager body 1, featuring a compact structure capable of preventing energy loss during transmission, improving overall stability of the massager, and ensuring consistent performance during the long-term use.

The sliding groove 705 adopts an overall closed-loop structure, and is distributed with periodic undulations in an axial direction of the rotary stage 704. The structure provides a property of undulating path to the sliding groove 705, such that the oscillating frame 706 can be periodically pushed by an inner wall of the sliding groove 705 when the oscillating frame slides in the sliding groove 705, thereby realizing rhythmic oscillating motion, which not only enhances the dynamic performance of the massage element 4, but also provides a more natural massage experience for the user through its oscillating behavior.

The oscillating arm 707 is arranged on the circumferential wall of the oscillating frame 706, the oscillating arm 707 can be embedded in an internal cavity of the central structural portion 401, and motion of the oscillating arm 707 drives the central structural portion 401 and the lateral structural portion 402 to oscillate synchronously. This multi-dimensional oscillating design enables the massage element 4 to oscillate in a more three-dimensional manner, thereby achieving multi-level massage effect.

The central structural portion 401 uses a hollow structure, which provides the central structural portion with better flexibility and oscillating property, and can better conform to contours of the human body and meet various massage needs. In contrast, the lateral structural portion 402 uses a solid structure, which enhances the overall rigidity of the massage element, and ensures that it is not easily deformed or damaged during oscillation. The functional division effectively extends the service life of the massager, and balances flexibility with structural stability.

The power transmission of the transmission assembly 7, combined with the oscillation of the massage element 4, makes oscillating amplitude and frequency adjustable according to specific needs of the massage area, thereby providing precise and stronger massage effect. Combined with the structural division between the central structural portion 401 and the lateral structural portion 402, the massager conforms better to the massage area, reduces discomfort caused by excessive pressure, and improves comfort and effectiveness of the massage.

Figure 12:
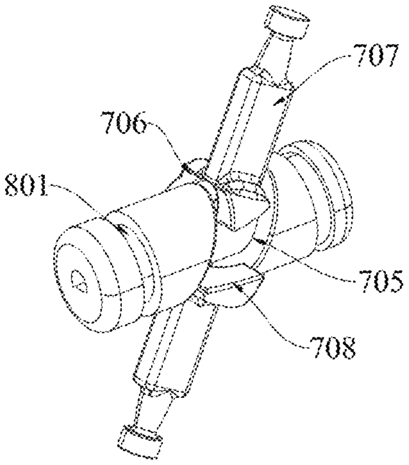
FIG. 12 is a first structural diagram of an oscillating frame of a massager according to the present disclosure.
Figure 13:
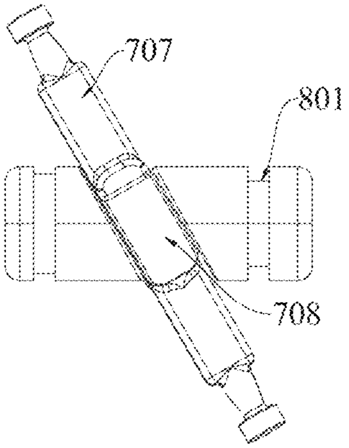
FIG. 13 is a second structural diagram of an oscillating frame of a massager according to the present disclosure.

As shown in FIGS. 11-13, the oscillating frame 706 is a ring-shaped structure, and correspondingly, the rotary stage 704 is a structure adapted to the oscillating frame in shape and dimensions. The oscillating frame 706 is embedded in the sliding groove 705. The oscillating frame 706 is a non-closed-loop structure, that is, a fully through notch 708 is formed on the circumferential wall of the oscillating frame 706. The notch 708 makes the oscillating frame 706 have a degree of mechanical flexibility, especially when the oscillating frame 706 is subjected to force from the inner wall of the sliding groove 705, part of the applied force can be released through the notch 708, for example, the oscillating frame 706 undergoes an axial distortion, which is conducive to protecting the oscillating frame 706 from damage due to excessive force, and preventing the massage area from being subjected to excessive rigid force.

As shown in FIGS. 3, 11-13, both ends of the rotary stage 704, that is, the end adjacent to the drive member 701 and the end away from the drive member 701, are each provided with latching grooves 801. Correspondingly, latching projections 802 are formed at corresponding positions on an inner wall of a constraint member 10; the latching projections 802 is engaged with the latching grooves 801 in a sliding manner, and the sliding engagement makes the rotary stage 704 be subjected to axial constraint, but rotate freely in a circumferential direction.

In one specific embodiment, the constraint member 10 is further configured to constrain the circumferential rotation of the oscillating frame 706. Specifically, the constraint member 10 includes two coupled constraint half-shells that define a constraint space. The two coupled constraint half-shells form a constraint space, and both the rotary stage 704 and the oscillating frame 706 are located in the constraint space. For the rotary stage 704, the constraint member 10 restricts an axial displacement of the rotary stage through the latching projections 802, but allows rotational motion of the rotary stage 704 through the sliding engagement with between the latching projections 802 and the latching grooves 801. For the oscillating frame 706, a constraint slot is formed on the constraint member 10 in the axis direction, and the oscillating arm 707 of the oscillating frame 706 passes through the constraint slot. A root portion of the oscillating arm 707 (that is, the part connected to the oscillating frame 706) is engaged inside an edge of the constraint slot in a sliding manner, such that the oscillating arm 707 cannot rotate in unison synchronously with the rotary stage 704 in a circumferential direction, but can oscillate in the axis direction.

Figure 15:
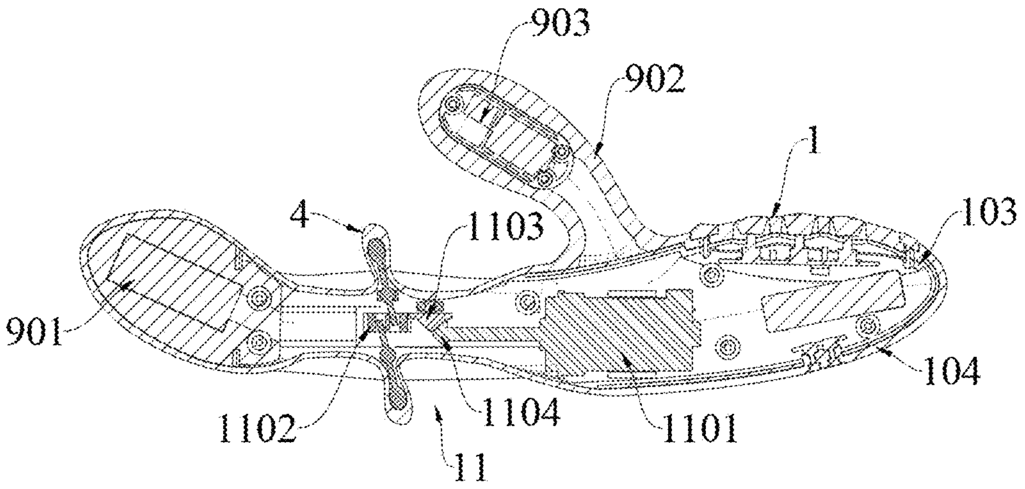
FIG. 15 is a structural diagram of a first drive assembly of a massager according to the present disclosure.
Figure 16:
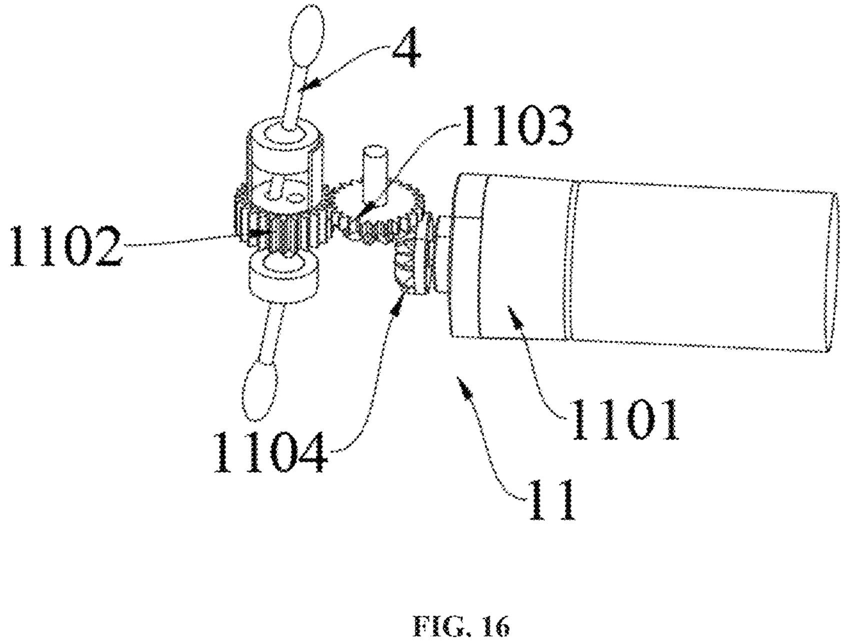
FIG. 16 is a perspective view of a first drive assembly of a massager according to the present disclosure.

As shown in FIGS. 15-16, in one specific embodiment, orbital oscillation of the massage element 4 is driven by a first drive assembly 11. Specifically, the first drive assembly 11 includes a motor 1101, a connecting structure in transmission connection with the motor 1101, and a rotating disk 1102 connected to the connecting structure.

A middle part of the massage element 4 is a sphere, and is rotatably embedded in a spherical socket.

The two massage elements 4 are inserted into insertion ports on the rotating disk 1102 at opposite inclination angles.

When the motor 1101 is powered on and activated, an output shaft of the motor generates rotational driving force. The rotational driving force is outputted through a second gear 1104 connected to a driving end of the motor 1101. Since the second gear 1104 is meshed and connected with a first gear 1103 (forming the connecting structure), rotation of the second gear 1104 will drive the first gear 1103 to rotate in an opposite direction.

A toothed portion of the first gear 1103 is meshed with the toothed surface on a sidewall of the rotating disk 1102. Therefore, rotation of the first gear 1103 will drive the rotating disk 1102 to rotate about its own central axis. Rotational speed and direction of the rotating disk 1102 depend on a rotational speed of the motor 1101, and a gear ratio and a meshing method between the second gear 1104 and the first gear 1103.

The two massage elements 4 are inserted and fixed into the insertion ports on the rotating disk 1102 at the opposite inclination angles, that is, when one the massage element 4 is tilted inward at an angle $\alpha$ relative to a radial direction of the rotating disk 1102, the other massage element 4 will be tilted outward at the same angle $\alpha$ (or both are tilted in opposite directions relative to a certain axis).

As the rotating disk 1102 rotates, bases of the two massage elements 4 (that is, portions inserted into the rotating disk 1102) mounted on the rotating disk will perform circular motion in unison with the rotating disk 1102. Since the massage element 4 itself has a certain length and mounted at an inclination angle, and the spherical socket plays a constraint role, circumferential motion of the socket does not cause the entire massage element 4 to rotate coaxially. On the contrary, the inclined installation makes the ends of the massage element 4 (that is, portions that perform the massage function) oscillate axially when the rotating disk 1102 rotates, and a projection of the oscillatory path is a closed curve, such as a circle, an ellipse, or other similar shapes.

Since the two massage elements 4 are mounted on the same rotating disk 1102 and driven by the same motor 1101 through the same gear mechanism, their oscillating motion is completely synchronized. However, initial installation angles of the two massage elements are opposite, so phases or directions of the same during the oscillation are opposite. For example, when the end of one massage element 4 oscillates in one direction, the end of the other massage element 4 oscillates synchronously in an opposite direction.

In summary, the second gear 1104 is driven by the motor 1101, the second gear 1104 drives the first gear 1103 to rotate, the first gear 1103 drives the rotating disk 1102 to rotate, and the two massage elements 4 are mounted on the rotating disk 1102 at the opposite inclination angles, such that only one first drive assembly 11 can drive the two massage elements 4 to perform synchronized oscillation in opposite directions, with trajectory at ends being a closed curve.

Figure 17:
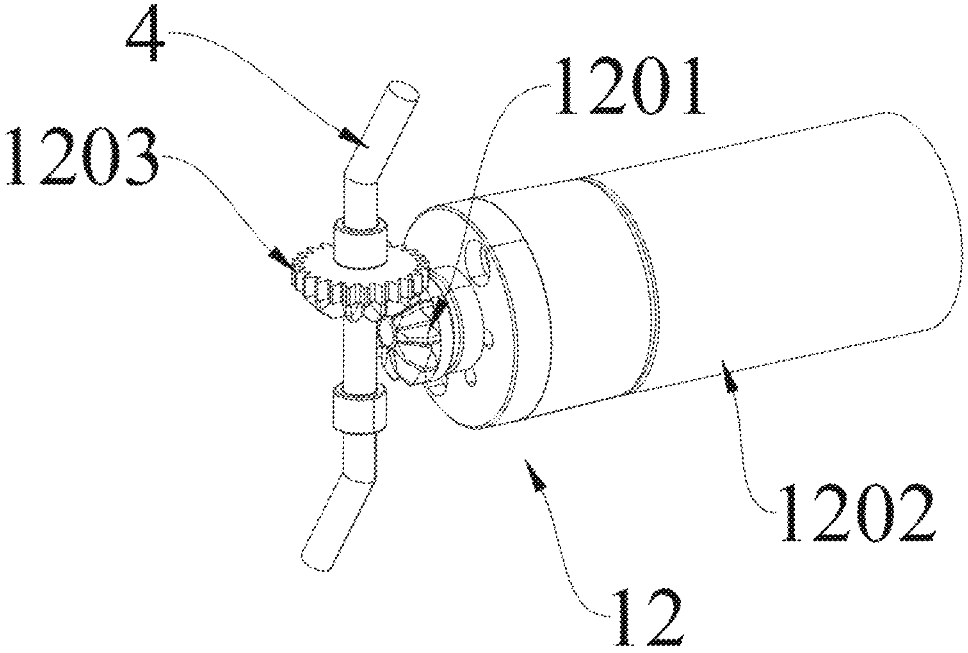
FIG. 17 is a perspective view of a second drive assembly of a massager according to the present disclosure.

As shown in FIG. 17, in an alternative driving method, the orbital oscillation is driven by a second drive assembly 12. The second drive assembly 12 includes a rotary motor 1202, a driving end of the rotary motor 1202 is connected to a driving gear 1201, and the driving gear 1201 is meshed and connected with a driven gear 1203. The massage element 4 is connected to the driven gear 1203, and the massage element 4 is bent to a certain extent.

In this way, when the rotary motor 1202 drives the driving gear 1201 to rotate, the driven gear 1203 rotates synchronously, thereby driving the massage element 4 to rotate synchronously. Moreover, since the massage element 4 is a bent structure, the end of the massage element will trace a closed circle or a quasi-circular curve when it rotates.

Of course, bending directions of the two opposite massage elements 4 are opposite, such that opposite and synchronized oscillation can be achieved.

As shown in FIG. 3, a first massage device 901 is arranged inside the first end 101 of the massager body 1, the first massage device 901 is configured to provide massage stimulation in the form of vibration at the position. The first massage device 901 is a vibrating motor.

As shown in FIG. 3, a support arm 902 is arranged on the circumferential wall of the massager body 1 and closer to the second end 102 to server as auxiliary massage element 4. The support arm 902 has an arc-shaped structure, extending outward from one side of the massager body 1 (a direction away from the massager body 1), with its free end and/or entire arm body being used to contact a specific part of the human body, thereby providing additional massage stimulation.

Because of its arc-shaped structure, the support arm 902 can naturally conform to a contour of the human body, achieve flexible contact during motion and provide targeted stimulation according to different massage needs. Through cooperation with the central structural portion 401 and the lateral structural portion 402, the support arm 902 can provide a multi-point, multi-layered massage experience in the massage area.

Further, a surface of the support arm 902 can be optimized for different application scenarios. For example, the free end of the support arm 902 may be covered with a flexible material or a textured surface to improve comfort and friction during contact, ensuring that no slippage occurs during the massage. An overall structure of the support arm 902 can be also be enhanced by optimizing materials and geometric design to improve elasticity, such that the support arm can achieve moderate deformation when being subjected to form, which ensures not only the operation stability of the massager, but also improves the flexibility and adaptability of the massage.

Figure 14:
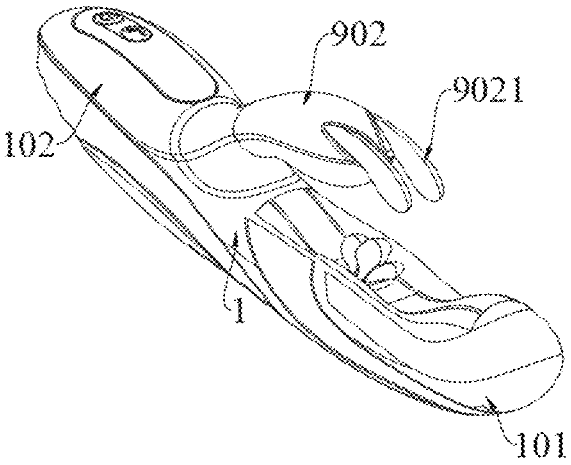
FIG. 14 is a fourth perspective view of a massager according to the present disclosure.

As shown in FIG. 14, the end of the support arm 902 is provided with a plurality of elastic auxiliary massage arms 9021. The auxiliary massage arms 9021 can be in elastic contact with the massage area, and move with reciprocating motion of the massager body 1, or transmit vibrations from a second massage device 903, so as to enhance the massage sensation.

The support arm 902 can be provided with the active motion capability, such as by mounting a second massage device 903 near the free end in the support arm 902, and the second massage device 903 provides vibrational massage stimulation to a specific area external to the human body.

In the description of the embodiments of the present disclosure, it should be understood that the terms "upper", "lower", "front", "back", "left", "right", "vertical", "horizontal", "central", "top", "bottom", "top surface", "bottom", "inner", "outer", "inside", "outside" and other indicated orientations or positional relationships are based on orientation or position relations shown in the accompanying drawings.

In the description of the embodiments of the present disclosure, it should be noted that, unless otherwise explicitly specified and defined, the terms "mounting", "connecting", "connection" and "assembly" should be understood in a broad sense, for example, they may be a fixed connection, a detachable connection, or an integrated connection; and may be a direct connection, or an indirect connection via an intermediate medium, or communication inside two elements. For those of ordinarily skilled in the art, specific meanings of the above terms in the present disclosure could be understood according to specific circumstances.

In the description of the embodiments of the present disclosure, specific feature, structure, material or characteristics described may be combined in a suitable manner in any one or more embodiments or examples.

In the description of the embodiments of the present disclosure, it should be understood that that "-" and "~" represent the same range of two numerical values, and the range includes end values thereof, for example, "A-B" means a range greater than or equaling to A and less than or equaling to B. "A~B" means a range greater than or equaling to A and less than or equaling to B.

In the description of the embodiments of the present disclosure, the term "and/or" represents merely an association relationship describing associated objects, indicating that there may be three types of relationships, for example, A and/or B, which means three types of situation, that is, the existence of A alone, the existence of both A and B, and the existence of B alone. In addition, the character "/" herein generally indicates that the associated objects are in an "or" relationship.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A massager, comprising:
- a massager body;
- two massage elements arranged on a circumferential wall surface on opposite sides of an axis of the massager body; and
- a transmission assembly configured to convert a rotational input into a non-rotary, linear oscillating output to drive the two massage elements to perform synchronized linear oscillation in opposite directions, wherein the transmission assembly comprises:
  - a drive member having rotational driving force;
  - a rotary stage sleeved on the drive member; wherein a sliding groove is formed on a circumferential surface of the rotary stage, a cross-sectional shape of the sliding groove is an ellipse, the cross-sectional shape is formed by cutting in a direction parallel to the sliding groove, and a non-right angle is formed between a major axis of the ellipse and an axis of the rotary stage;
  - an oscillating frame, wherein the oscillating frame is arranged in cooperation with the sliding groove, performs oscillating motion caused by periodic undulation of the sliding groove when the rotary stage rotates, and transmits the oscillating motion to the massage elements; and
  - a constraint member connected to the oscillating frame, and configured to constrain rotation of the oscillating frame in a circumferential direction.

2. The massager according to claim 1, wherein the two massage elements are driven by the same transmission assembly to perform the synchronized linear oscillation in the opposite directions.

3. The massager according to claim 1, wherein
- each of the two massage elements comprises a central structural portion and a lateral structural portion; and both the central structural portion and the lateral structural portion extend in a direction away from a circumferential wall surface of the massager body.

4. The massager according to claim 3, wherein the lateral structural portion is an arc-shaped curved structure, starts from one side of the central structural portion, curves outward in a direction away from the central structural portion and gradually extends to form an arc-shaped contour.

5. The massager according to claim 4, wherein a number of the lateral structural portions is two, and the two lateral structural portions are arranged on opposite sides of the central structural portion in an axis direction of the massager body.

6. The massager according to claim 4, wherein the central structural portion is sheet-like, cylindrical, or spherical.

7. The massager according to claim 4, wherein the central structural portion and the lateral structural portion are connected by an elastic wall.

8. The massager according to claim 4, wherein the central structural portion is a hollow structure, and the lateral structural portion is a solid structure.

9. The massager according to claim 3, wherein the oscillating frame comprises two oscillating arms that are arranged opposite to each other; and the two oscillating arms are respectively embedded in the central structural portion of the two massage elements.

10. The massager according to claim 3, wherein the circumferential wall surface of the massager body is provided with a slot recessed toward the axis of the massager body;

the two massage elements are positioned in the slot; and the central structural portion and the lateral structural portions are partially located in the slot, and partially protrude above an opening plane of the slot.

11. The massager according to claim 1, further comprising:

a first massage device; wherein the first massage device is arranged in the massager body; and the first massage device is configured to provide massage stimulation in the form of vibration.

12. The massager according to claim 1, wherein the massager body is provided with a support arm; and the support arm is arranged on the circumferential wall surface of the massager body.

13. The massager according to claim 12, wherein an end of the support arm is provided with a plurality of elastic auxiliary massage arms.

14. The massager according to claim 12, further comprising:

a second massage device; wherein the second massage device is arranged in the support arm; and the second massage device is configured to provide massage stimulation in the form of vibration.

15. The massager according to claim 1, wherein the massager body is configured as a rod-shaped or a spherical body.

16. The massager according to claim 1, wherein the massager body comprises a hard inner shell and an elastic outer layer, and the outer layer is wrapped around the inner shell.

* * * * *